US012576994B2

(12) United States Patent
    Griffiths

(10) Patent No.: US 12,576,994 B2
(45) Date of Patent: Mar. 17, 2026

(54) DIAPHRAGM FOR A FLUID STORAGE TANK

(71) Applicant: CAM LOCK LIMITED, Aldershot (GB)

(72) Inventor: Joseph Anthony Griffiths, Aldershot (GB)

(73) Assignee: CAM LOCK LIMITED, Aldershot (GB)

( * ) Notice: Subject to any disclaimer, the term of this patent is extended or adjusted under 35 U.S.C. 154(b) by 378 days.

(21) Appl. No.: 18/201,530

(22) Filed: May 24, 2023

(65) Prior Publication Data

US 2023/0383768 A1      Nov. 30, 2023

(30) Foreign Application Priority Data

May 25, 2022    (GB) ..................................... 2207717

(51) Int. Cl.
     *F17C 13/00*          (2006.01)
     *B64G 1/40*           (2006.01)
                  (Continued)

(52) U.S. Cl.
     CPC ........... *B64G 1/4021* (2023.08); *B64G 1/402* (2013.01); *B65D 83/771* (2025.01); *F15B 1/12* (2013.01);
                  (Continued)

(58) Field of Classification Search
     CPC .......... A61M 5/14586; A61M 5/14593; B05B 9/047; B05B 11/026; B05B 11/027; B60K 2015/03085; B65D 83/0094; B65D 83/62;

B65D 83/771; B65D 83/7711; B67D 1/045; F02K 9/605; F15B 1/10; F15B 1/12; F15B 1/126; F15B 1/14; F15B 1/16;
(Continued)

(56) References Cited

U.S. PATENT DOCUMENTS

| | | | | | |
|---|---|---|---|---|---|
| 2,278,688 A | * | 4/1942 | Caminez | ............... | F16L 55/052 |
| | | | | | 138/30 |
| 2,721,580 A | * | 10/1955 | Greer | ..................... | F15B 1/165 |
| | | | | | 220/86.1 |

(Continued)

FOREIGN PATENT DOCUMENTS

| | | | | | |
|---|---|---|---|---|---|
| EP | 1647760 A2 | * | 4/2006 | ............... | F17B 1/26 |
| GB | 2613617 A | * | 6/2023 | ........... | B64G 1/4021 |
| WO | WO-2010149381 A1 | * | 12/2010 | ............. | B65D 35/28 |

*Primary Examiner* — Kenneth Rinehart
*Assistant Examiner* — Richard K. Durden
(74) *Attorney, Agent, or Firm* — ArentFox Schiff LLP; Joseph M. Maraia

(57)          ABSTRACT

A diaphragm for use in a fluid storage tank in which the fluid storage tank comprises first and second shell portions defining an interior tank space, wherein the diaphragm is configured to be secured within the interior tank space between the first and second shell portions, to define a fluid storage reservoir between the diaphragm and one of the shell portions. The diaphragm comprises a body of deformable material having a part-spherical portion defining a central longitudinal axis. A thickness of the diaphragm varies between different regions of the diaphragm. The thickness of the diaphragm is asymmetric about the longitudinal axis. Also provided is a fluid storage tank including such a diaphragm.

15 Claims, 9 Drawing Sheets

(51) Int. Cl.
   *B65D 83/00*      (2006.01)
   *B65D 83/62*      (2006.01)
   *F15B 1/12*      (2006.01)
   *F16J 3/02*      (2006.01)
   *F02K 9/60*      (2006.01)

(52) U.S. Cl.
   CPC ............... *F16J 3/02* (2013.01); *F17C 13/008* (2013.01); *B65D 83/62* (2013.01); *F02K 9/605* (2013.01); *F15B 2201/3151* (2013.01); *F17C 2201/0185* (2013.01)

(58) Field of Classification Search
   CPC ............... F15B 1/165; F15B 2201/315; F15B 2201/3151; F15B 2201/3152; F15B 2201/3158; F15B 2201/61; F16J 3/00; F16J 3/02; F16J 3/06; F17C 13/008; F17C 2201/0176; F17C 2201/018; F17C 2201/0185; F24D 3/1016; G01F 3/225; G01F 15/16
   USPC ..... 92/6 D, 96, 98 D, 98 R; 138/30; 141/27; 220/530, 720; 222/95, 105, 386.5; 239/323; 417/394, 395, 474; 604/132
   See application file for complete search history.

(56) References Cited

U.S. PATENT DOCUMENTS

| | | | | |
|---|---|---|---|---|
| 2,865,541 A | * | 12/1958 | Hicks | B05B 9/047 |
| | | | | 222/386.5 |
| 2,931,392 A | * | 4/1960 | Mercier | F15B 1/10 |
| | | | | 138/30 |
| 2,968,319 A | * | 1/1961 | Ball | F16L 55/053 |
| | | | | 138/30 |
| 3,228,558 A | * | 1/1966 | Doyle | G01F 23/00 |
| | | | | 222/386.5 |
| 3,277,925 A | * | 10/1966 | Sugimura | F16L 55/052 |
| | | | | 138/30 |
| 3,504,827 A | * | 4/1970 | Larson | B64D 37/06 |
| | | | | 222/541.3 |
| 3,656,662 A | * | 4/1972 | Peterson | B65D 88/62 |
| | | | | 222/386.5 |
| 3,902,638 A | * | 9/1975 | Gillespie | B65D 88/62 |
| | | | | 222/386.5 |
| 4,129,025 A | * | 12/1978 | Carey | B21D 51/16 |
| | | | | 72/348 |
| 4,216,881 A | * | 8/1980 | Rosman | B65D 88/62 |
| | | | | 220/723 |
| 4,437,590 A | * | 3/1984 | LaBruna | F16J 3/06 |
| | | | | 222/386.5 |
| 5,111,856 A | * | 5/1992 | Baralle | F17C 9/00 |
| | | | | 222/394 |
| 5,176,178 A | * | 1/1993 | Schurter | F24D 3/1016 |
| | | | | 138/30 |
| 5,215,450 A | * | 6/1993 | Tamari | F04B 43/0072 |
| | | | | 138/119 |
| 5,306,257 A | * | 4/1994 | Zdeb | A61M 5/14586 |
| | | | | 604/251 |
| 5,398,851 A | * | 3/1995 | Sancoff | B65D 83/625 |
| | | | | 222/399 |
| 5,505,228 A | * | 4/1996 | Summerfield | F15B 1/165 |
| | | | | 138/30 |
| 5,833,119 A | * | 11/1998 | Kolacek | B65D 83/764 |
| | | | | 222/49 |
| 7,337,925 B2 | * | 3/2008 | Imaizumi | B65D 81/32 |
| | | | | 215/6 |
| 2004/0065374 A1 | * | 4/2004 | Baltes | F15B 1/10 |
| | | | | 138/30 |

* cited by examiner

DIAPHRAGM FOR A FLUID STORAGE TANK

CROSS-REFERENCE TO RELATED APPLICATION(S)

This application claims priority to Great Britain Patent Application No. 2207717.6 filed May 25, 2022, the disclosure of which is incorporated herein by reference in its entirety for all purposes.

FIELD OF THE INVENTION

The present invention relates to a diaphragm for use in a fluid storage tank, and in particular for a diaphragm for use in a vehicle propellant storage tank.

BACKGROUND

It is known to provide fluid storage tanks which comprise two shell portions defining an interior tank space, and a flexible diaphragm disposed between the two shell portions. A fluid storage reservoir is defined between the diaphragm and one of the shell portions. As the tank empties of fluid, the diaphragm collapses and inverts towards the shell portion which partially defines the fluid storage reservoir, thereby reducing the volume of the fluid storage reservoir within the tank.

It is important for satisfactory operation of the fluid storage tank that as the tank empties, the diaphragm collapses and inverts fully and with minimal resistance, to maximise the operational life of a satellite when installed therein. The geometric shape and configuration of the diaphragm can have a significant impact on the effective operation of the diaphragm, and thereby the fluid storage tank, during use. Some conventional diaphragm designs can result in resistance to deformation and/or unsatisfactory tank discharge performance. One example is gathering or bunching of the diaphragm in the middle of the tank which contributes to the collapse resistance.

It is therefore an object of the present invention to provide a diaphragm which alleviates or overcomes one or more of the problems mentioned above.

SUMMARY

The present invention provides a diaphragm for use in a fluid storage tank in which the fluid storage tank comprises first and second shell portions defining an interior tank space, wherein the diaphragm is configured to be secured within the interior tank space between the first and second shell portions, to define a fluid storage reservoir between the diaphragm and one of the shell portions, wherein the diaphragm comprises a body of deformable material having a part-spherical portion defining a central longitudinal axis, wherein a thickness of the diaphragm varies between different regions of the diaphragm, and wherein the thickness of the diaphragm is asymmetric about the longitudinal axis.

The present disclosure is directed to the concept of a diaphragm having an asymmetrical thickness about central longitudinal axis of diaphragm. That is, one side of the diaphragm about the central axis is thicker than other. This may advantageously encourage deflection to initiate preferentially at one side of the diaphragm and propagate towards other region of diaphragm during use. The diaphragm thickness is asymmetric considered relative to a radial direction with respect to the longitudinal axis.

The thickness of the part-spherical portion may be asymmetrical about the longitudinal axis.

The diaphragm may be asymmetric about a longitudinal plane extending through and parallel to the longitudinal axis.

The diaphragm may have a first thickness at a first side of the diaphragm and a second thickness at a second side of the diaphragm opposite to the first side, and the first thickness may be less than the second thickness.

The diaphragm thickness may transition evenly from the first side to the second side. The diaphragm thickness may transition unevenly from the first side to the second side.

The diaphragm may have a region of uniform first thickness at the first side and a region of a different uniform second thickness at the second side, and a transition region between the first side and the second side where the thickness transitions from the first thickness to the second thickness.

The part spherical portion may be hemi-spherical.

A skirt portion may extends from a perimeter edge of the part-spherical portion. The skirt portion may be substantially cylindrical and extend substantially parallel to the longitudinal axis. The skirt portion may be flared and may taper outwardly relative to the longitudinal axis in a direction away from the part-spherical portion.

The diaphragm may comprise a crimped and/or patterned thickness to assist deformation.

The diaphragm may be made of an elastically deformable material, and may be made of an elastomeric material.

The diaphragm may comprise a perimeter flange extending radially outwardly from a perimeter edge of the diaphragm.

Also provided is a fluid storage tank comprising first and second shell portions defining an interior tank space, and a diaphragm as described above secured within the interior tank space between the first and second shell portions, to define a fluid storage reservoir between the diaphragm and one of the shell portions.

BRIEF DESCRIPTION OF THE DRAWINGS

Embodiments of the invention will now be described by way of example only, with reference to the accompanying drawings in which.

DETAILED DESCRIPTION

Figure 1:
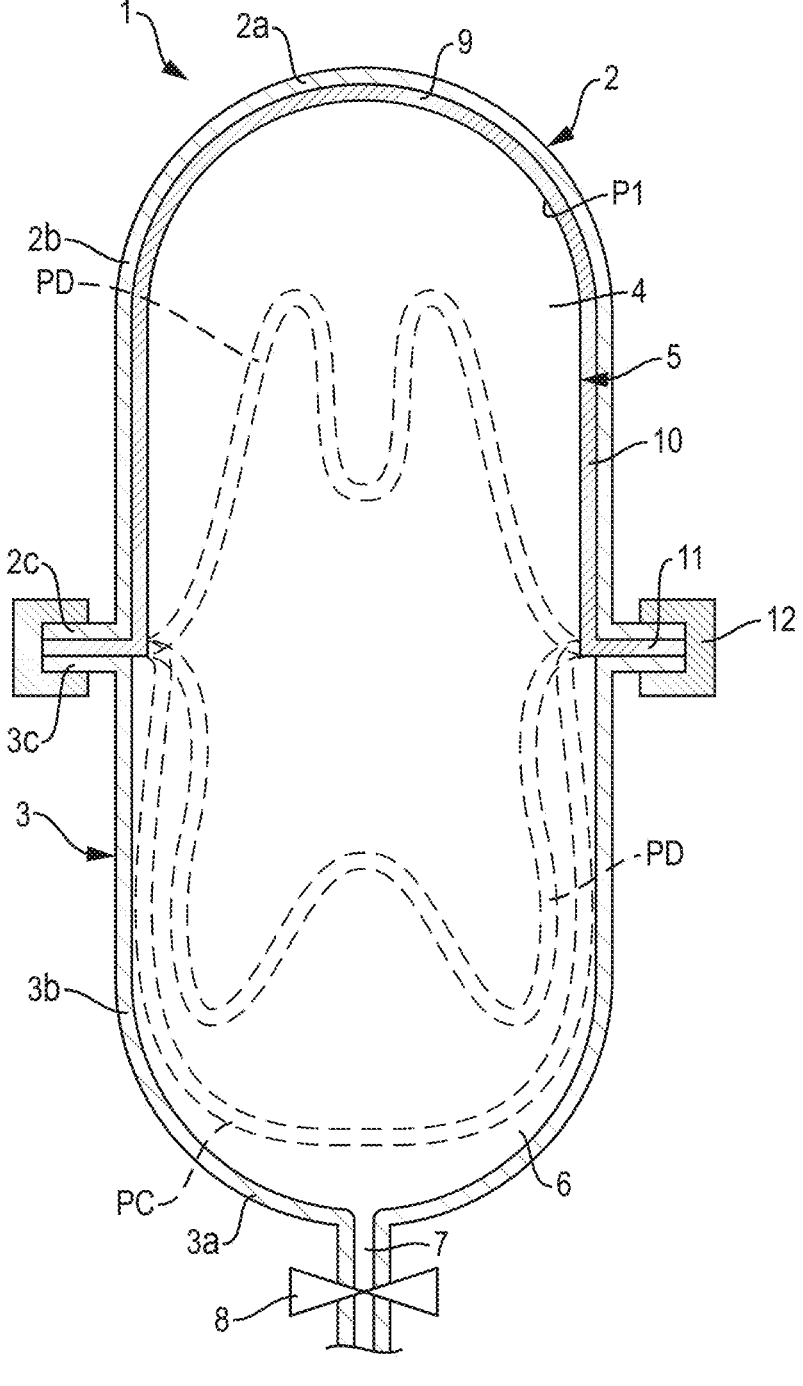
FIG. 1 shows a cross-sectional view of a known configuration of fluid storage tank and diaphragm in an assembled state.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

Referring to FIG. 1, a known configuration of fluid storage tank 1 (hereafter "tank" for brevity) is shown. Such tanks are used in a variety of applications, particularly where pressurised fluid is required to be stored and discharged from the tank. One such application is in space vehicles, such as satellites for example, where such tanks are used to store pressurised liquid for use as a propellant for orientation thrusters of the space vehicle. Such propellant and thrusters may be used, for example, to maintain a specific relative orientation of a satellite during orbit.

The tank 1 comprises first and second shell portions 2, 3, which are connectable together to define an interior tank space 4. In the tank 1 shown in FIG. 1, the first and second shell portions 2, 3, respectively comprise an upper and lower shell, each having a substantially hemispherical region 2a, 3a, and a cylindrical region 2b, 3b. Each shell portion 2, 3 comprises an outwardly-extending flange 2c, 3c extending from a peripheral edge of a respective cylindrical portion 2b, 3b.

A flexible or deformable diaphragm 5 (hereafter "diaphragm") is disposed within the interior tank space 4 and a fluid storage reservoir 6 (hereafter "reservoir") is defined between the diaphragm 5 and one of the shell portions 2, 3, of the tank 1. In the example of the known tank 1 shown in FIGS. 1 and 2, the reservoir 6 is defined between the diaphragm 5 and the second shell portion 3. The shell portion 3 of the tank 1 defining the reservoir comprises a fluid outlet 7 and an outlet valve 8 for the controlled discharge of fluid from the reservoir 6.

Figure 2:
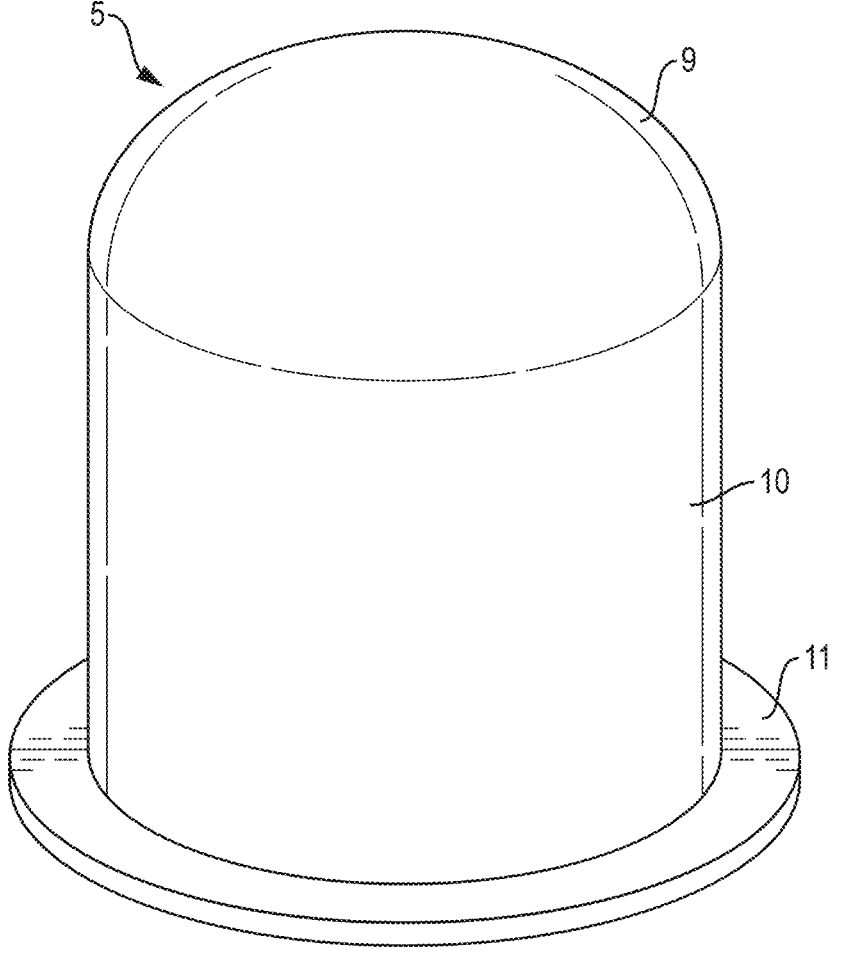
FIG. 2 is a perspective view of the known configuration of diaphragm of FIGS. 1 to 2 in an undeformed state.

FIG. 2 shows a known configuration of a diaphragm 5 in a relaxed, undeformed state. The diaphragm 5 is a component comprising a body made of a deformable material, which is advantageously an elastically deformable material, such as an elastomer. In its relaxed state, the diaphragm 5 comprises a domed region 9, a skirt or cylindrical region 10 extending from the domed region 9, and a flange 11 extending outwardly from a peripheral edge of the cylindrical region 10, remote from the domed region 9.

Referring to FIG. 1, when assembled as part of a tank 1, the diaphragm 5 is initially disposed in an initial position PI within the interior tank space 4 with the domed and cylindrical regions 9, 10 of the diaphragm 5 lying against or proximate to the inside surface of the first shell portion 2. The flange 11 of the diaphragm 5 is clamped between the flanges 2c, 3c of the two shell portions 2, 3. The two shell portions 2, 3 are held together by a securing element comprising a clamping ring 12. The diaphragm 5 thereby partitions the interior tank space 4 and the reservoir 6 is thereby a sealed space defined between the diaphragm 5 and the second shell portion 3.

In use, the reservoir 6 is initially filled with a propellant fluid (not shown), usually in liquefied form. As the propellant is required for use, it is discharged from the reservoir 6 via the fluid outlet 7 by controlled opening of the outlet valve 8. As the supply of propellant within the reservoir 6 is depleted, the volume of the reservoir 6 reduces accordingly by the gradual collapsing of the diaphragm 5 from its initial position towards the second shell portion 2. This is facilitated by the elastic nature of the diaphragm 5. The collapsing movement of the diaphragm 5 is shown by the diaphragm 5 being illustrated in broken lines in two intermediate discharging positions PD in FIG. 1, and in a final collapsed end position PC, also shown in broken lines.

The maximum operational lifespan of a space vehicle, such as a satellite, may be dictated at least in part by the availability of propellant fuel for thrusters of a stabilisation system to maintain the space vehicle accurately oriented in a desired orbit. The cost of putting a space vehicle into space orbit is extremely high, and so it is highly desirable for a space vehicle to remain in operational orbit for a long as possible, and for the tank 1 to reliably allow full discharge of the propellant during the operational life of the space vehicle to maximise the useable lifespan of the space vehicle. Furthermore, a space vehicle must remain operational for a certain period of time to recoup the costs of manufacture and launch into orbit, and so any restriction on the operational lifespan of the space vehicle negatively impacts the profitability of the space vehicle.

Known configurations of tank 1 can suffer drawbacks in allowing full discharge due to the diaphragm 5 resisting or being unable to fully collapse and invert from its initial position PI to a final collapsed position in which the diaphragm 5 is fully inverted into the second shell portion 3 of the tank 1 and the volume of the reservoir 6 reduced to the smallest volume possible. This is shown, for example, in FIG. 1 where in the final position PC, space remains in the reservoir 6 between the diaphragm 5 and the inner surface of the second, lower shell portion 3.

The above drawback can at least be in part due to gathering or bunching towards the middle of the diaphragm 5 that provides resistance to and/or prevents the diaphragm 5 from fully collapsing and inverting.

Embodiments of the disclosure will now be described in which like features with the known arrangements previously described, retain the same reference numerals where appropriate.

Figure 3:
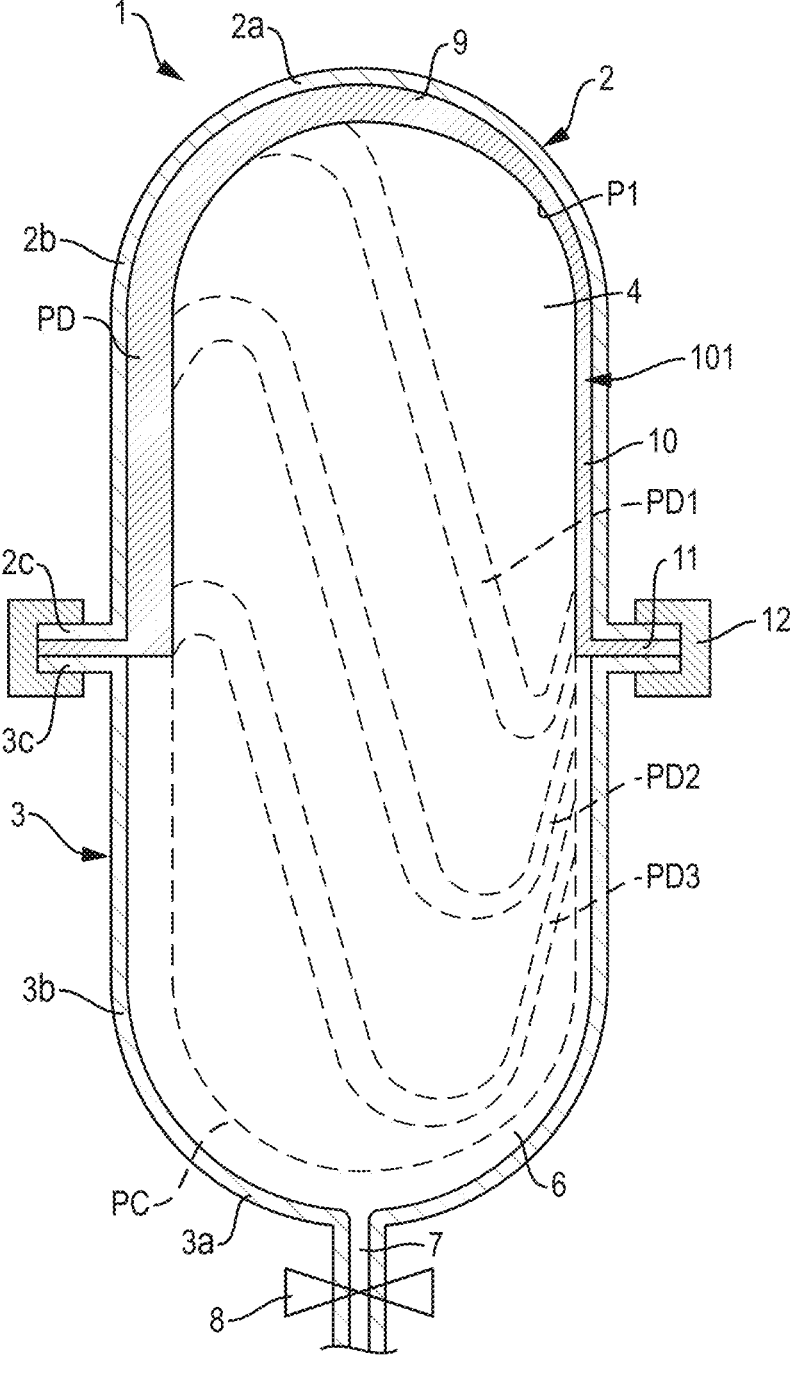
FIG. 3 shows a cross-sectional view of a fluid storage tank comprising a diaphragm according to a first embodiment of the invention.
Figure 4:
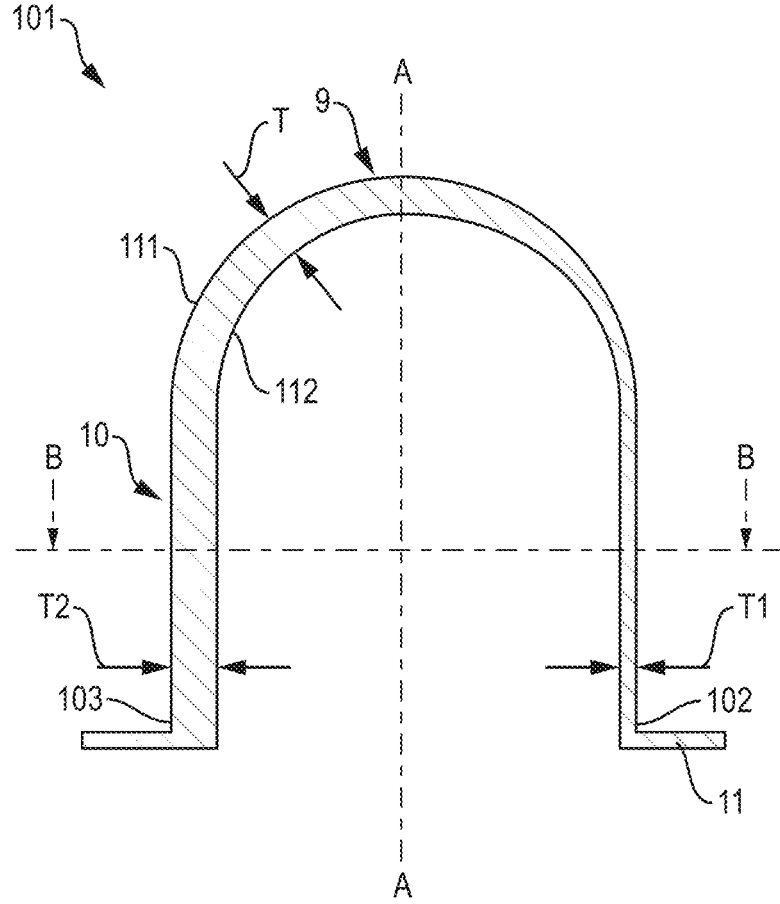
FIG. 4 shows a vertical cross-sectional view of the diaphragm according the first embodiment of the invention.

Referring to FIGS. 3 and 4, a diaphragm 101 of a first embodiment of the invention is shown for use in a fluid storage tank 1, such as the tank described above and illustrated in FIG. 1. FIG. 3 shows the diaphragm 101 disposed in such a fluid storage tank 1 in a substantially undeformed initial position PI (shown in solid lines and shading) when the reservoir 6 is full of fluid. FIG. 3 also shows the diaphragm 101 in three stages of deformation (PD1, PD2, PD3) progressing towards a substantially fully collapsed and inverted position PC, when the majority or all of the fluid has been discharged from the reservoir 6. Positions PD1, PD2, PD3 and PC of diaphragm 101 are shown in broken lines in FIG. 3.

The diaphragm 101 retains similar features to the diaphragm 5 shown in FIGS. 1 and 2 including a domed region 9, a skirt or cylindrical region 10 extending from the domed region 9, and a flange 11 extending outwardly from a peripheral edge of the cylindrical region 10. The diaphragm 101 is made of an elastically deformable material, such as an elastomer.

Figure 5:
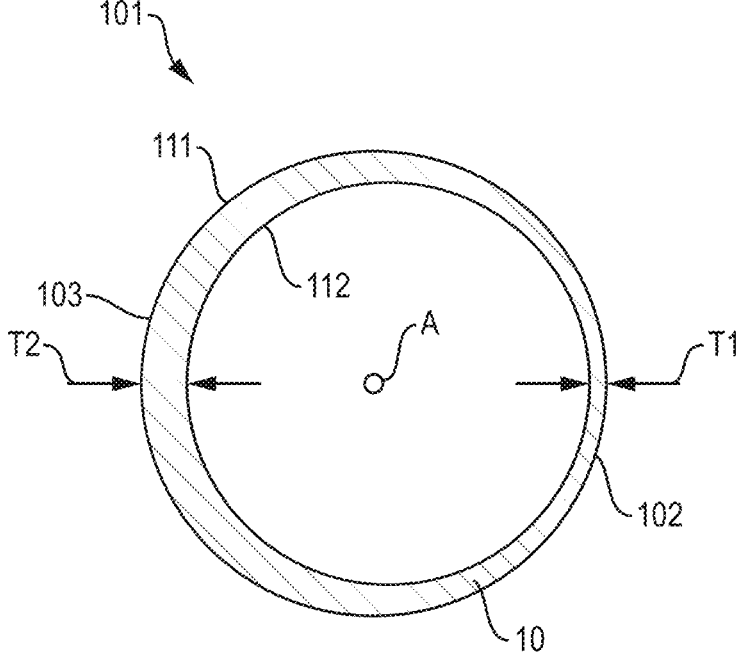
FIG. 5 shows a horizontal cross-sectional view of the diaphragm of FIG. 4, taken along the line B-B of FIG. 4.

Referring to FIG. 4, a vertical cross-sectional view of the diaphragm 101 is shown. The diaphragm 101 has a longitudinal axis A-A extending through the centre of the domed region 9 and centre of the cylindrical region 10. The diaphragm 101 is substantially circular in plan view, that is, looking in a direction of the longitudinal axis A-A. A difference with the diaphragm 101 shown in FIGS. 3 and 4 is that the thickness of the diaphragm 101 varies around the circumference of the diaphragm 101. That is, the thickness of the diaphragm is asymmetrical about the longitudinal axis A-A. The diaphragm has an outer surface 11 and an inner surface 112. The thickness T of the diaphragm at any point is a distance between the inner and outer surfaces measured in a direction perpendicular to the outer and inner surfaces 11, 112. The thickness T of the diaphragm 101 varies from a first side 102 of the diaphragm 101 to a second side 103, diametrically opposite to the first side 102. This is also shown in FIG. 5 which shows a horizontal cross-sectional view taken along the line B-B in FIG. 4. FIG. 5 also shows the longitudinal axis A-A extending into the plane of the page. It can be seen from FIGS. 4 and 5 that the thickness of the diaphragm 101 at the first side 102 is a dimension T1, and a thickness of the diaphragm 101 at the second side 103 is a dimension T2. T1 is less than T2 and the thickness T of the diaphragm continuously transitions from T1 to T2 across the width of the diaphragm from the first side 102 to the second side 103. That is, in the first exemplary embodiment, the thickness T of the diaphragm goes from T1 to T2 evenly in a consistent and even rate of thickness variation from the thinnest region at the first side 102 to this thickest region at the second side 103. This even thickness transition advantageously also occurs across the domed region 9 from the first side 102 to the second side 103 of the diaphragm 101. However, in other embodiments intended within the scope of the present disclosure, the thickness variation may occur only across the cylindrical portion 10 and the dome portion 9 may be of a uniform thickness.

Operation of the diaphragm 101 in use of the tank 1 will now be described, particularly with reference to FIG. 3. The diaphragm 101 starts in the initial position PI. As fluid in the reservoir 6 is discharged, the diaphragm 101 deforms and collapses towards the end position PC. In doing so, the diaphragm 101 goes through intermediate deformation positions PD1 then PD2 then PD3. Due to the thinner diaphragm thickness T1 at the first side 102 of the diaphragm 101, the diaphragm 101 initially begins to deform and collapse at the first side 102, shown by profile PD1. This is because the diaphragm 101 has less structural stiffness in the thinner region T1 and so is less resistant to deformation under changing internal fluid pressure within the reservoir 6 during fluid discharge. As the fluid continues to be discharged from the reservoir 6, the diaphragm's collapse progresses from the thinner region T1 at the first side 102, across the width of the diaphragm 101/tank 1 towards the thicker region T2 at the opposite, second side 103 of the diaphragm 101, illustrated by the subsequent collapse profiles PD2 and PD3. Therefore, the varying nature of the thickness T of the diaphragm 101 across its width causes an even and progressive deformation to propagate from the first side 102 to the second side 103 of the diaphragm 101. Such collapse may be analogous to a wave-like motion propagating from a thinner region of the diaphragm 101 towards the thicker region, until the diaphragm 101 reaches the final, fully collapsed/inverted position PC. This biasing of the deformation by means of the varying thickness profile helps avoid random regions of the diaphragm collapsing at different times and helps avoid bunching or gathering of the diaphragm, thereby avoiding the associated drawbacks of such deformation described above.

Figure 6:
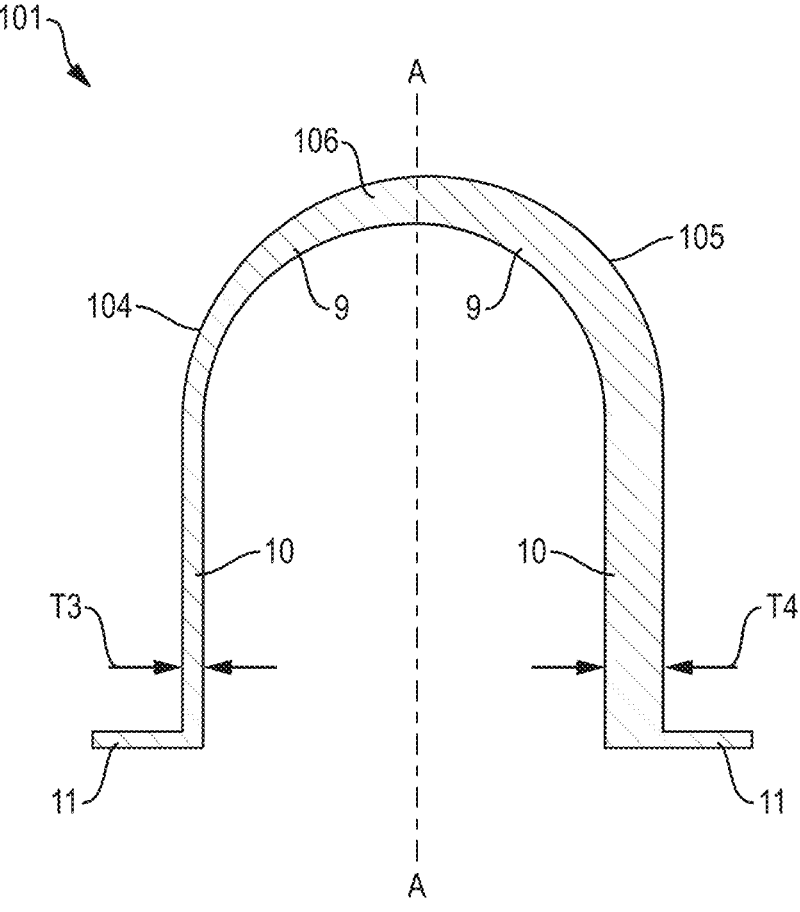
FIG. 6 shows a vertical cross-sectional view of a diaphragm according a second embodiment of the invention.

FIG. 6 shows a diaphragm 101 of a second embodiment. As with the first embodiment, the diaphragm comprises a part-spherical domed region 9, a cylindrical region 10 extending from the domed region 9, and a flange 11 extending outwardly from a peripheral edge of the cylindrical region 10. The diaphragm 101 has a longitudinal axis A-A extending through the centre of the domed region 9 and centre of the cylindrical region 10, and the diaphragm 101 is substantially circular in plan view.

A difference with the diaphragm 101 of the second embodiment is that the diaphragm 101 comprises two distinct regions of different thicknesses, a first region 104 and a second region 105. The first region 104 has substantially uniform thickness T3 with respect to the longitudinal direction. The second region 105 has substantially uniform thickness T4 with respect to the longitudinal direction. A transitional region 106 is disposed between the first and second regions 104, 105 at which the diaphragm 101 transitions from the thickness T3 of the first region 104 to the thickness T4 of the second region 105. The diaphragm 101 transitions from the thickness T3 to the thickness T4 around the circumference of the diaphragm. However, alternatively, the diaphragm may include regions of uniform thickness extending partially circumferentially around the diaphragm at the first and second regions 104, 105. In all cases, there is an asymmetry in the thickness profile about a longitudinal plane extending through the central axis line A-A such that T3<T4. By 'longitudinal plane' it is meant a plane parallel to, and extending through, the central axis A-A.

In use, as fluid in the reservoir 6 is discharged, the diaphragm 101 deforms and collapses as described above, through the intermediate discharging positions PD1, PD2 and PD3, towards the end position PC shown in FIG. 3. The asymmetrical thickness profile acts to guide the deformation of the diaphragm 101 such that deformation initiates at the first side 104 where the thickness T3 is less than the thickness T4 at the second side. This operation, similar to that of the first embodiment described above, also serves to provide an even and progressive deformation to propagate from the first side 104 to the second side 105 of the diaphragm 101, helping avoid random regions of diaphragm collapse and so helping avoid bunching or gathering and the associated drawbacks discussed previously.

Figure 7:
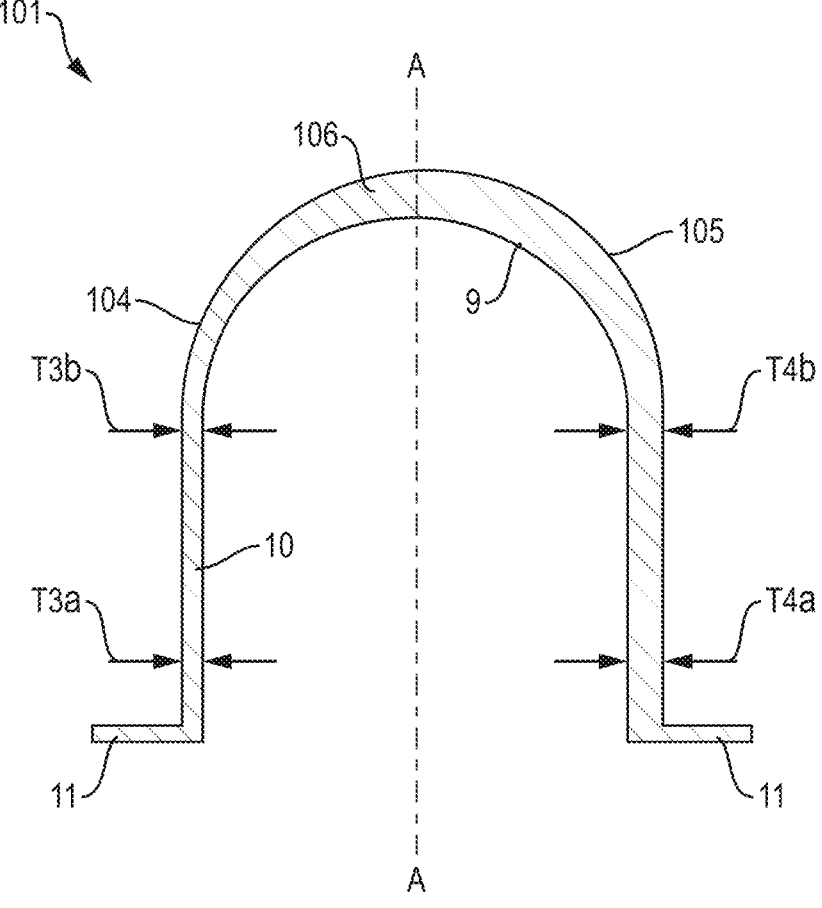
FIG. 7 shows a vertical cross-sectional view of a diaphragm according to a third embodiment of the invention.

FIG. 7 shows a diaphragm 101 of a third embodiment. As with the first and second embodiments, the diaphragm comprises a part-spherical domed region 9, a cylindrical region 10 extending from the domed region 9, and a flange 11 extending outwardly from a peripheral edge of the cylindrical region 10. The diaphragm 101 has a longitudinal axis A-A extending through the centre of the domed region 9 and centre of the cylindrical region 10, and the diaphragm 101 is substantially circular in plan view. Like features in common with the diaphragms 101 of the previous embodiment retain the same reference numerals.

A difference with the diaphragm 101 of the third embodiment is that the thickness of the first 104 and second 105 regions are not constant in a longitudinal direction of the diaphragm as with the second embodiment, and instead increase from the edge of the diaphragm 101 proximate the flange 11 towards the domed region 9 at the centre of the diaphragm 101. That is, T3a<T3B and T4a<T4b. However, the thickness profile is still asymmetrical about the longitudinal axis A-A, such that T3a<T4a and T3b<T4b. Therefore, the deformation of the diaphragm 101 in use is encouraged to initiate at the first region 104 and to propagate evenly towards the second region 105 as described above, and with the above-mentioned advantages in use.

Figure 8:
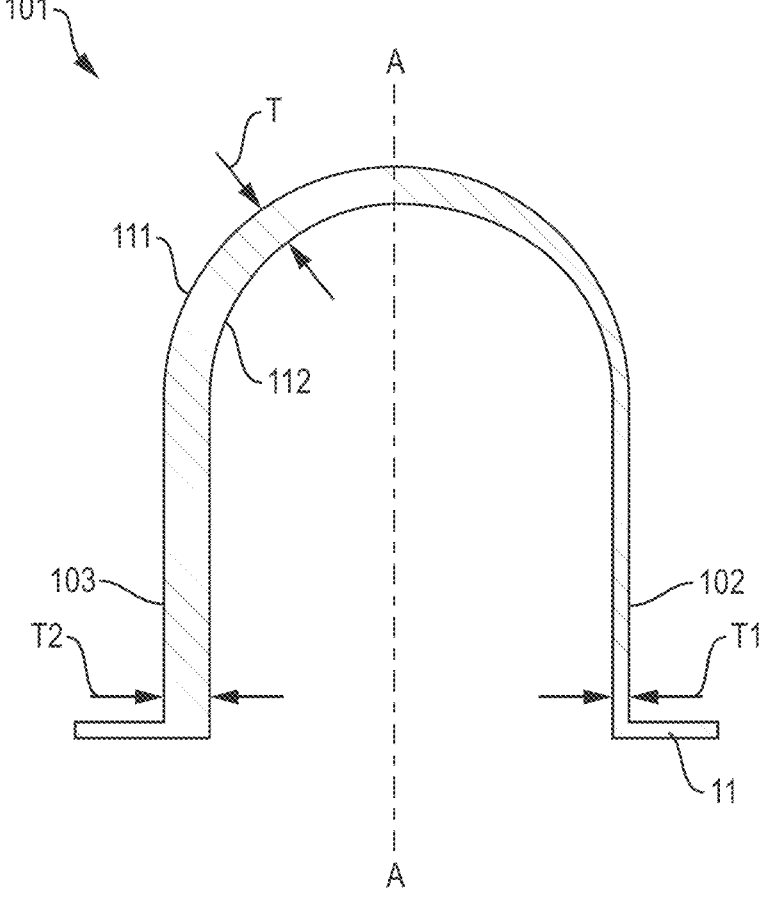
FIG. 8 shows a vertical cross-sectional view of a diaphragm according to a fourth embodiment of the invention.

FIG. 8 shows a diaphragm of a fourth embodiment, in which like features with the previously-described embodiments retain the same reference numerals. The diaphragm 101 of the fourth embodiment is similar to that of the first embodiment, and comprises a part-spherical domed region 9 and a flange 11 extending outwardly from a peripheral edge of the diaphragm. The diaphragm 101 has a longitudinal axis A-A extending through the centre of the domed region 9 and the diaphragm 101 is substantially circular in plan view.

A difference with the diaphragm 101 of the fourth embodiment is that the diaphragm 101 does not include a cylindrical region 10 extending from the domed region 9, and so the flange 11 extends outwardly from a peripheral edge of the domed region 9. It will therefore be appreciated that a diaphragm 101 of the fourth embodiment would be used with tanks 1 of a spherical configuration rather than a more elongate configuration as shown in FIGS. 1 and 3.

As with the first embodiment, the thickness of the diaphragm 101 varies around the circumference and so is asymmetrical about the longitudinal axis A-A. The thickness T of the diaphragm 101 varies from a first side 102 of the diaphragm 101 to a second side 103, diametrically opposite to the first side 102. The thickness T1 of the diaphragm 101 at the first side 102 is less than a thickness T2 of the diaphragm 101 at the second side 103. The thickness T of the diaphragm continuously transitions from T1 to T2 across the width of the diaphragm 101 from the first side 102 to the second side 103. Operation of the diaphragm 101 of the fourth embodiment is the same as that of the first embodiment, with the exception that the progressing deformation does not include any cylindrical region 10 and so it is only the domed region 9 that deforms and collapses from an initial position PI to a final fully collapsed and inverted position PC. However, the above-mentioned technical and functional advantages described previously are achieved by the asymmetrical thickness profile of the diaphragm 101.

Figure 9:
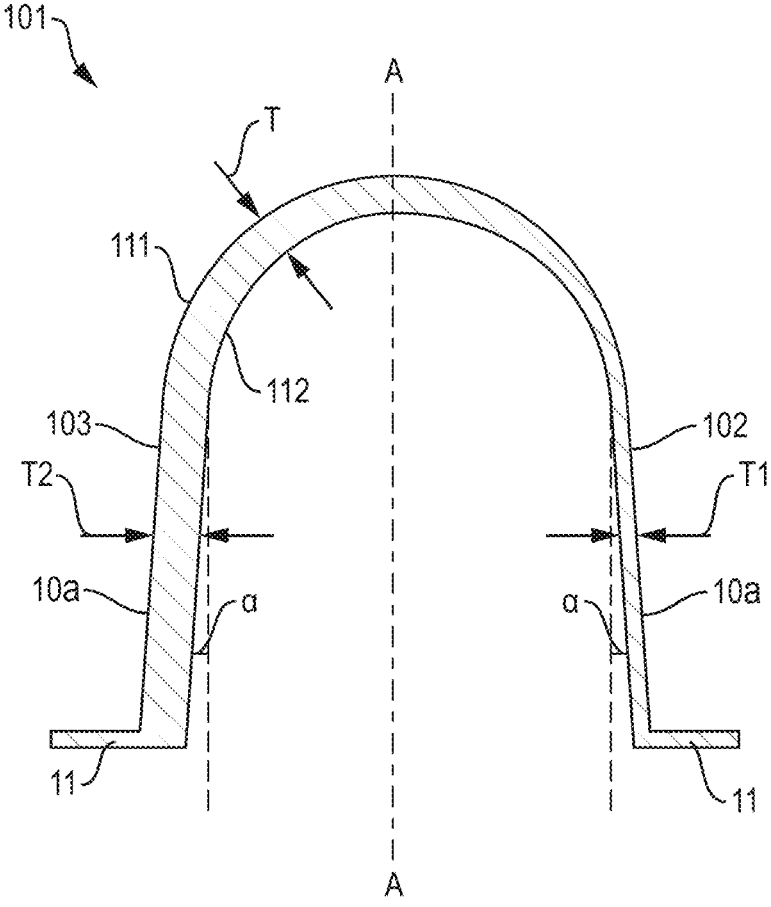
FIG. 9 shows a vertical cross-sectional view of a diaphragm according to a fifth embodiment of the invention.

FIG. 9 shows a diaphragm of a fifth embodiment, in which like features with the previously-described embodiments retain the same reference numerals. The diaphragm 101 of the fifth embodiment is similar to that of the first embodiment, and comprises a part-spherical domed region 9, and a flange 11 extending outwardly from a peripheral edge of the diaphragm. The diaphragm 101 has a longitudinal axis A-A extending through the centre of the domed region 9 and the diaphragm 101 is substantially circular in plan view.

A difference with the diaphragm 101 of the fifth embodiment is that the diaphragm 101 does not include a cylindrical region 10 extending from the domed region 9, but instead includes a skirt in the form of a tapering side wall region 10a extending from the domed region 9. The tapering side wall region 10a flares outwardly away from the central axis A-A from the domed region to the flange 11. The flange 11 extends outwardly from a peripheral edge of the tapered wall region 10a which is distal to the domed region 9. The outward taper of flaring of the side wall 10a can be seen in FIG. 9 as shown by an angle α relative to a direction parallel to the central axis A-A.

As with the first embodiment, the thickness of the diaphragm 101 varies around the circumference and so is asymmetrical about the longitudinal axis A-A. The thickness T of the diaphragm 101 varies from a first side 102 of the diaphragm 101 to a second side 103, diametrically opposite to the first side 102. The thickness T1 of the diaphragm 101 at the first side 102 is less than a thickness T2 of the diaphragm 101 at the second side 103. The thickness T of the diaphragm continuously transitions from T1 to T2 across the width of the diaphragm 101 from the first side 102 to the second side 103. Operation of the diaphragm 101 of the fourth embodiment is the same as that of the first embodiment. The tapering side wall region 10a can help facilitate the deflection and inversion of the diaphragm from the initial position PI through the intermediate positions through to the final, fully collapsed/inverted position PC. However, the above-mentioned technical and functional advantages described previously are still achieved by the asymmetrical thickness profile of the diaphragm 101.

In any of the embodiments described above, there may be additionally provided a thickness profile with a crimped and/or patterned thickness that is asymmetric about the longitudinal plane to further assist in control of the deformation profile.

In any of the embodiments described above, there may be provided a varying asymmetric thickness which has its deformation further aided by projections from the storage tank 1.

It is to be appreciated that in alternative embodiments intended within the scope of the present disclosure, alternative means for achieving controlled deformation of the diaphragm 101 by an asymmetric diaphragm 101 thickness about a longitudinal axis/plane may be employed. Furthermore, the diaphragm may comprise regions of uniform thickness, regions of varying thickness, regions of constantly varying thickness, and/or regions of non-constantly varying thickness. Diaphragms within the scope of the present disclosure may comprise multiple regions of varying thickness profiles. All such variations having an asymmetrical thickness profile may facilitate the above-described progressive collapse/inversion action with the above-described advantages.

It will be appreciated that compatible features of the above-described embodiments can be combined and substituted to form a diaphragm, a fluid storage tank, a space vehicle propellant storage tank and/or a space vehicle, that falls within the scope of the present disclosure.

In the above-described embodiments the two shell portions 2, 3 are held together by a securing element comprising a clamping ring 12. However, in alternative embodiments intended within the scope of the present disclosure, alternative means to secure the shell portions 2, 3 together, and thereby retain the diaphragm 5 in place, may be employed. Such securing means may include any known mechanical fastening means, such as a plurality of perimeter clamps or bolts extending through the flanges 2c, 3c, of the shell portions 2, 3. Yet further, the securing means within the scope of the invention may additionally, or alternatively, comprise adhesive or other bonding agent securing the shell portions 2, 3 and diaphragm 5 together, or the shell portions 2, 3 being welded together.

In the above-described embodiments the upper and lower shell 2, 3, each have a substantially hemispherical region 2a, 3a, a cylindrical region 2b, 3b and an outwardly-extending flange 2c, 3c extending from a peripheral edge of a respective cylindrical portion 2b, 3b. However, in alternative embodiments intended within the scope of the present disclosure, the tank 1, and therefore the diaphragm 101, can be differently shaped, for example, the upper and lower shell 2, 3 can be hemispherical, the tank 1 comprising a spherical shape. In a further embodiment intended within the scope of the present disclosure, the upper and lower shell 2, 3 can comprise more than one planar face, or comprise more than one cylindrical region. In some embodiments at least one of the upper and lower shell 2, 3 do not comprise a flange 2c, 3c. In some embodiments, the first and second shell portions 2, 3 are not symmetrical.

In embodiments described above, the diaphragms 101 comprise a domes region 9 which is part-spherical. Within the scope of the present disclosure, it is intended that part-spherical may include configurations which are hemispherical, that is, half of a sphere, and other proportions of a spherical shape which may be less than half of a sphere.

It will be appreciated that the varying thicknesses T of the diaphragms 101 shown in the figures are not drawn to scale and do not represent actual diaphragm dimensions or thickness ratios. The thicknesses are exaggerated to assist in illustration and understanding.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

The invention claimed is:

1. A diaphragm for use in a fluid storage tank in which the fluid storage tank comprises first and second shell portions defining an interior tank space, wherein the diaphragm is configured to be secured within the interior tank space between the first and second shell portions, to define a fluid storage reservoir between the diaphragm and one of the shell portions;

wherein the diaphragm comprises a body of deformable material having a part-spherical portion defining a central longitudinal axis;

wherein a thickness of the diaphragm varies between different regions of the diaphragm; and wherein the thickness of the diaphragm is asymmetric about the longitudinal axis.

2. A diaphragm according to claim 1 wherein the thickness of the diaphragm is asymmetric about a longitudinal plane extending through and parallel to the longitudinal axis.

3. A diaphragm according to claim 1 wherein the diaphragm has a first thickness at a first side of the diaphragm and a second thickness at a second side of the diaphragm opposite to the first side, and wherein the first thickness is less than the second thickness.

4. A diaphragm according to claim 3 wherein the diaphragm thickness transitions evenly from the first side to the second side.

5. A diaphragm according to claim 3 wherein the diaphragm thickness transitions unevenly from the first side to the second side.

6. A diaphragm according to claim 3 wherein the diaphragm has a region of uniform first thickness at the first side and a region of a different uniform second thickness at the second side, and a transition region between the first side and the second side where the thickness transitions from the first thickness to the second thickness.

7. A diaphragm according to claim 1 wherein the part spherical portion is hemi-spherical.

8. A diaphragm according to claim 1 wherein a skirt portion extends from a perimeter edge of the part-spherical portion.

9. A diaphragm according to claim 8 wherein the skirt portion is substantially cylindrical and extends substantially parallel to the longitudinal axis.

10. A diaphragm according to claim 8 wherein the skirt portion is flared and which tapers outwardly relative to the longitudinal axis in a direction away from the part-spherical portion.

11. A diaphragm according to claim 1 comprising a crimped and/or patterned thickness to assist deformation.

12. A diaphragm according to claim 1, wherein the diaphragm is made of an elastically deformable material.

13. A diaphragm according to claim 1, wherein the diaphragm is made of an elastomeric material.

14. A diaphragm according to claim 1, comprising a perimeter flange extending radially outwardly from a perimeter edge of the diaphragm.

15. A fluid storage tank comprising first and second shell portions defining an interior tank space, and a diaphragm according to claim 1, secured within the interior tank space between the first and second shell portions, to define a fluid storage reservoir between the diaphragm and one of the shell portions.

* * * * *